United States Patent
Collins et al.

(10) Patent No.: US 7,640,981 B2
(45) Date of Patent: Jan. 5, 2010

(54) SCALE INHIBITION METHOD

(75) Inventors: Ian Ralph Collins, Middlesex (GB); Paul Anthony Sermon, Oxon (GB)

(73) Assignee: BP Exploration Operating Company Limited, Middlesex (GB)

( * ) Notice: Subject to any disclaimer, the term of this patent is extended or adjusted under 35 U.S.C. 154(b) by 26 days.

(21) Appl. No.: 11/658,029

(22) PCT Filed: Jul. 19, 2005

(86) PCT No.: PCT/GB2005/002821

§ 371 (c)(1),
(2), (4) Date: Jul. 19, 2007

(87) PCT Pub. No.: WO2006/008506

PCT Pub. Date: Jan. 26, 2006

(65) Prior Publication Data

US 2007/0284100 A1    Dec. 13, 2007

(30) Foreign Application Priority Data

Jul. 21, 2004    (GB) .................................. 0416310.1
Feb. 1, 2005    (GB) .................................. 0501980.7

(51) Int. Cl.
  *E21B 43/16* (2006.01)
(52) U.S. Cl. .................................. 166/275; 166/305.1
(58) Field of Classification Search ........................ None
  See application file for complete search history.

(56) References Cited

U.S. PATENT DOCUMENTS

| 3,891,394 A | 6/1975 | Smith et al. |
| 4,723,603 A | 2/1988 | Plummer |
| 2002/0131923 A1 | 9/2002 | Acton et al. |

FOREIGN PATENT DOCUMENTS

| WO | WO 94/06998 | 3/1994 |
| WO | WO 00/79095 A1 | 12/2000 |
| WO | WO 03/106810 A1 | 12/2003 |

*Primary Examiner*—Zakiya W Bates
*Assistant Examiner*—Angela M DiTrani
(74) *Attorney, Agent, or Firm*—Nixon & Vanderhye

(57) ABSTRACT

A scale inhibition method comprising: (a) injecting a dispersion of seed particles of an insoluble mineral salt in an aqueous medium into a formation through an injection well wherein the seed particles have an equivalent spherical diameter of 100% less than 100 nm, preferably 100% less than 50 nm, more preferably 100% less than 25 nm and the aqueous medium has dissolved therein precipitate precursor ions that form a precipitate of the insoluble mineral salt when contacted with resident ions in the formation; (b) allowing the dispersion to percolate through the subterranean formation towards production well and producing the dispersion from the production well; and (c) controllably precipitating the insoluble mineral salt onto the seed particles so as to reduce the deposition of the insoluble mineral salt onto the walls of the porous formation and/or onto the surface in the production well and/or onto the surface downstream of the production well.

26 Claims, 2 Drawing Sheets

SCALE INHIBITION METHOD

This application is the U.S. National Phase of International Application PCT/GB2005/002821, filed 19 Jul. 2005, which designated the U.S. PCT/GB2005/002821 claims priority to British Application No. 0416310.1 filed 21 Jul. 2004, and British Application No. 0501980.7 filed 1 Feb. 2005. The entire content of these applications are incorporated herein by reference.

This present invention relates to a method of inhibiting the deposition of mineral scales in a formation and/or in a production well and/or downstream thereof e.g. in flow lines from the wellhead, in a gas/liquid separator or in a transportation pipeline leaving the separator. The method of the present invention involves introducing seed particles of a scaling mineral salt into an injection water that contains precipitate precursor ions and injecting the resulting dispersion into a formation via an injection well.

BACKGROUND THE INVENTION

Underground formation waters can contain resident ions such as barium (e.g. at a level of up to 3000 ppm, for example 50-500 ppm) and usually also calcium (e.g. at a level of up to 30,000 ppm, for example 1000-5000 ppm) both in the form of soluble chlorides, but also in the presence of sulphate ions, so the water is saturated with barium sulphate, and usually also calcium sulphate. This formation water can meet seawater water, which can contain precipitate precursor ions such as soluble carbonate (e.g. at 100-5000 ppm) and sulphate (e.g. at 1000-3500 ppm). Mixing the two waters produces an aqueous supersaturated solution of barium sulphate and/or barium carbonate, and/or calcium sulphate and/or calcium carbonate, from which scale comprising these compounds deposits on surfaces. The meeting of the two waters can be in the formation, when seawater containing precipitate precursor ions is injected into the formation through an injection well at a distance from a production well to enhance oil recovery (i.e. a water flood treatment). The scaling may occur in the production well or downstream thereof e.g. in flow lines, or gas/liquid separators (for separating oil/water from gas) or in transportation pipelines leaving the gas/liquid separators. Carbonate scale may particularly form in the gas/liquid separator or downstream thereof, due to reduction in gas pressure causing soluble calcium bicarbonate to form insoluble calcium carbonate.

Scaling problems may be mitigated by using scale inhibitors. Traditionally, scale inhibitors have been squeezed into a formation from a production well. However, it has recently been proposed to introduce scale inhibitors into a formation via an injection well. Thus, WO 03/106810 describes a method of inhibiting scale formation in a subterranean formation comprising:

(a) injecting a suspension comprising particles of a controlled release scale inhibitor suspended in an aqueous medium into a formation through an injection well wherein the particles have a mean diameter of less than 10 microns, preferably less than 5 microns, more preferably less than 1 micron;

(b) allowing the suspension to percolate through the subterranean formation towards a production well; and (c) controllably releasing the scale inhibitor from the particles in the near well bore region of the production well.

A method of controlling deposition of mineral scale from an aqueous supersaturated solution of the mineral salt onto a solid surface is described in WO 00/79095. This method does not involve the use of a scale inhibitor compound. Instead the method relies on:

(a) forming a composition comprising a dispersion of either (i) seed crystals of the mineral salt in an aqueous solution of the mineral salt or (ii) seed crystals of a salt isomorphous with the mineral salt in an aqueous solution of the isomorphous salt, the seed crystals of the dispersion having a Mean particle size of less than 2.5 microns;

(b) distributing said composition into either (i) an aqueous supersaturated solution of the mineral salt or (ii) an aqueous precursor liquid of the aqueous supersaturated solution which aqueous precursor liquid is saturated with respect to the seeds, and in the case of (b)(ii) converting the aqueous precursor liquid into an aqueous supersaturated solution of the mineral salt; and (c) contacting the treated aqueous supersaturated solution with the solid surface.

The dispersion of seed crystals is preferably formed by subjecting an aqueous supersaturated solution of the mineral salt or of the isomorphous salt to sonic or ultrasonic vibration. WO 00/79095 describes applying the treatment when two or more formation waters or production waters meet, or either or both meet seawater. Such mixings occur when the waters especially production waters from more than one source are to be reinjected downhole via a single line. The treatment is especially applied between a produced water separator and a commingling location. However, it is clear that this treatment is only intended to prevent deposition of scale on metal surfaces in the injection well and that it was not envisaged that seed particles could propagate through the formation together with the injection water.

SUMMARY OF THE INVENTION

It has now been found that seed particles having an equivalent spherical diameter of 100% less than 100 nm, preferably 100% less than 50 nm, more preferably 100% less than 25 nm, may be dispersed in an injection water that contains precipitate precursor ions and that the resulting dispersion may be injected into a formation to reduce the deposition of precipitates onto the walls of the porous formation and/or on surfaces of the production well and/or on surfaces downstream of the production well.

Thus, according to the present invention there is provided a method of inhibiting deposition of an insoluble mineral salt onto the walls of a porous subterranean formation, and/or onto a surface in a production well and/or onto a surface downstream of the production well, the method comprising:

(a) injecting a dispersion of seed particles of an insoluble mineral salt in an aqueous medium into the formation through an injection well wherein the seed particles have an equivalent spherical diameter of 100% less than 100 nm, preferably 100% less than 50 nm, more preferably 100% less than 25 nm and the aqueous medium has dissolved therein precipitate precursor ions that form a precipitate of the insoluble mineral salt when contacted with resident ions in the formation;

(b) allowing the dispersion to percolate through the formation towards a production well and producing the dispersion from the production well; and (c) controllably precipitating the insoluble mineral salt onto the seed particles in the formation and/or in the production well and/or downstream of the production well so as to reduce the deposition of the insoluble mineral salt onto the walls of the porous formation and/or onto the surface in the production well and/or onto the surface downstream of the production well.

"Equivalent spherical diameter" is defined as the "diameter of a spherical particle which will give identical geometric, optical, electrical or aerodynamic behaviour to that of the particle (non-spherical) being examined; sometimes referred to as the Stokes diameter for particles in non-turbulent flows" (1990, 62, 2184 IUPAC Compendium of Chemical Terminology 2nd Edition [1997]). An equivalent spherical diameter of the seed particles may be determined using light scattering techniques such as photon correlation spectroscopy or by sedimentation techniques such as the use of an Andresan pipette.

Without wishing to be bound by any theory, it is believed that reduction in the deposition of the insoluble mineral salt is due to controlled precipitation of the mineral salt onto the seed particles. Thus, the seed particles act by:
(i) reducing the average crystal size of the mineral salt which precipitates out of solution so that the precipitate is less likely to cause blockages; and
(ii) accelerating the rate at which the mineral salt precipitates out of solution.

The precipitate of the insoluble mineral salt is commonly termed scale and these terms may be used synonymously herein.

Precipitate precursor ions are defined as ions which form insoluble mineral salt precipitates at the conditions of the formation and/or in the production well and/or downstream thereof when they contact resident ions. Resident ions are defined as naturally or artificially occurring ions already present in the formation. These resident ions may also be contained in water that is produced from the formation. The precipitate precursor ions must be a different ionic species and oppositely charged to the resident ionic species they contact in the formation.

Specific ions which can be precursor ions of insoluble mineral salt precipitates include $SO_4^{2-}$, $CO_3^{2-}$, $HCO_3^-$, $HS^-$ and mixtures thereof.

Resident ions already present in the formation which have been observed to form insoluble mineral salt precipitates upon contact with precipitate precursor ions include $Ba^{2+}$, $Sr^{2+}$, $Mg^{2+}$, $Ca^{2+}$, $Fe^{2+}$, $Fe^{3+}$, $Al^{3+}$, $Pb^{2+}$, $Zn^{2+}$ and mixtures thereof.

The resident ions may be naturally occurring in the formation water or may be artificially occurring as a result of some prior treatment process. The resident ions need only be present in the formation at a sufficient concentration to form scaling precipitates with the precursor ions at formation conditions when the dispersion is injected into the formation. Similarly, the resident ions need only be present in water produced from the formation at a sufficient concentration to form scaling precipitates with the precursor ions at production well conditions and/or at conditions downstream of the production well.

The actual precursor ion concentration at which precipitation of an insoluble mineral salt occurs for a given case is a function of many variables including the concentration of other ions in solution and the in situ conditions of, for example, temperature, pressure and pH. A person skilled in the art can, in many cases, predict precipitation from data collected from a formation and can therefore apply the present method before significant deposition of scale actually occurs. It is also envisaged that the method of the present invention may be applied as a remedial action after deposition of scale is observed on surfaces in the production well and/or on surfaces downstream thereof.

Typically, the aqueous medium of the dispersion is an injection water. Preferably, the injection water is seawater, aquifer water, a produced water, river water, and mixtures thereof. Preferably, the injection water is obtained from a single source or where the injection water is obtained from a plurality of sources, the commingled waters are compatible in that they do not generate precipitates of insoluble mineral salts.

The seed particles that are dispersed in the aqueous medium are of equivalent spherical diameter of 100% less than 100 µm, preferably, 100% less than 50 nm, more preferably 100% less than 25 µm.

Preferably, the concentration of seed particles in the aqueous medium is less than 200 ppmw, preferably less than 100 ppmw.

Preferably, the seed particles are substantially spherical or of any other shape that can readily propagate through the pores of the formation.

Although the seed particles may increase in size owing to deposition of mineral scale thereon, the particles should remain small enough to migrate through the formation and pass into the production well. The person skilled in the art would understand that the size to which the particles may grow in the formation can be controlled, for example, by varying the rate at which the dispersion percolates or propagates through the formation and the distance over which the dispersion percolates or propagates. In order to mitigate the risk of particles of mineral scale being deposited in the formation, it is preferred that the seed particles grow to a size no greater than an equivalent spherical diameter of 100% less than 150 nm. This has a further advantage in that particles having an equivalent spherical diameter of 100% less than 150 µm remain effective as seed particles within the production well and downstream thereof.

Suitably, the dispersion propagates through the formation at a rate of 15 to 100 feet per day. Suitably, the injection well is 0.25 to 1 mile from the production well.

The person skilled in the art will understand that where the formation is a hydrocarbon bearing formation, the hydrocarbons are displaced with the dispersion towards the production well and are co-produced from the production well with the dispersion.

Suitably, the dispersion of seed particles in the aqueous medium may be prepared by mixing an aqueous solution of the precipitate precursor ions with an aqueous solution of "resident ions" i.e. ions which are known to be resident in the formation.

The size of the seed particles may be controlled by varying the concentration of precipitate precursor ions in the aqueous solution of the precipitate precursor ions (hereinafter "first aqueous solution") and/or the concentration of resident ions in the aqueous solution of the resident ions (hereinafter "second aqueous solution"). The size of the seed particles may also be controlled by varying the mixing ratios of the two solutions. Preferably, the concentration of precipitate precursor ions in the first aqueous solution is in the range 50 to 2000 ppm, preferably 125 to 1000 ppm, more preferably, 200 to 750 ppm, for example 250 to 500 ppm. Preferably, the concentration of resident ions in the second aqueous solution is in the range 50 to 2000 ppm, preferably 125 to 1000 ppm, more preferably, 250 to 900 ppm, for example, 300 to 800 ppm. Preferably, the mixing ratios of the first aqueous solution to the second aqueous solution is in the range 1:3 to 3:1 by volume, more preferably 1:2 to 2:1 by volume, for example about 1:1 by volume. The size of the seed particles may also be controlled by adding a water-soluble lower alcohol, for example, a $C_1$-$C_4$ alkanol, preferably, ethanol, to one or both of the first and second aqueous solutions. Suitably, the water-soluble alcohol is added to the aqueous solution(s) in an amount of from 1:3 to 3:1 by volume, preferably 1:2 to 2:1 by volume, for example, about 1:1 by volume.

Suitably, the concentration of precipitate precursor ions in the aqueous medium of the dispersion remains above a threshold value for forming precipitates upon contact with the resident ions of the formation. Typically, the precipitate precursor ion concentration in the aqueous medium of the dispersion is above 10 ppm, preferably above 100 ppm, and more preferably above 500 ppm. Suitably, the aqueous medium of the dispersion will be unsaturated in resident ions. Preferably, the concentration of resident ions in the aqueous medium of the dispersion will be below the limit of detection.

Suitably, the aqueous solution of the precipitate precursor ions (first aqueous solution) may be mixed with the aqueous solution of the resident ions (second aqueous solution) in a reactor vessel with stirring, preferably under conditions of high shear so as to obtain a homogenous and reproducible sol. Suitable high shear mixing devices that may be employed to form the sol include an ULTRATURRAX™, SILVERSON™ or COUETTE™ mixer. Suitably, the shear rate in the reactor vessel is at least 0.5 ms$^{-1}$, preferably, at least 1 ms$^{-1}$, more preferably, at least 5 ms$^{-1}$, for example, at least 10 ms$^{-1}$.

Preferably, the residence time of the seed particles in the reactor vessel is less than 10 minutes, preferably less than 5 minutes so as to prevent secondary crystal growth on the seed particles.

Preferably, the seed crystals are produced in a continuous process. Preferred reactor vessels include mixed-suspension, classified-product, removal crystallizers. Such crystallizers are well known to the person skilled in the art and provide particles of a controlled particle size distribution.

As discussed above, the aqueous medium is generally an injection water that contains precipitate precursor ions. Suitably, the dispersion of seed particles in the injection water may be prepared by mixing an injection water that contains precipitate precursor ions (first aqueous solution) with an aqueous solution of resident ions (second aqueous solution) to generate a sol having dispersed therein seed particles of the insoluble mineral salt. It is envisaged that the whole of the injection water stream may be treated in this manner in which case the concentration of resident ions in the second aqueous solution should be substantially less that the concentration of precipitate precursor ions in the injection water thereby ensuring that precipitate precursor ions are retained in the aqueous medium of the resulting dispersion. Alternatively, the dispersion of seed particles in the injection water may be prepared by mixing a minor portion of the injection water with an aqueous solution of resident ions to generate a sol having dispersed therein seed particles of the insoluble mineral salt. This sol is then diluted back into the major portion of the injection water. In this case, it is envisaged that the aqueous medium of the sol may be unsaturated in both precipitate precursor ions and resident ions as the diluted sol will contain precipitate precursor ions arising from the major portion of the injection water. Preferably, the concentration of seed particles in the sol is in the range 500 to 1500 ppm (0.5 to 1.5 kg/tonne), for example, 1000 ppm (1 kg/tonne). Preferably, the concentration of seed particles in the diluted dispersion of seed particles is about 50 to 150 ppm (0.05 to 0.15 kg/tonne), for example, about 100 ppm (0.1 kg/tonne). Thus, the ratio of the minor and major portions of the injection water are varied so as to achieve the desired concentration of seed particles in the diluted dispersion. As an example, where the injection water is seawater and the formation contains barium resident ions, a minor portion of the seawater may be mixed with an aqueous solution of barium ions, e.g. an aqueous solution of barium chloride to generate a sol comprising seed particles of barium sulfate and/or barium carbonate. This sol is then diluted into the major portion of the injection water to generate a diluted dispersion of the seed particles. In particular, 10% of the seawater may be treated with an aqueous solution of barium chloride to generate a sol having a concentration of seed particles of about 1000 ppm (1 kg/tonne). This sol is then diluted back into the remainder of the injection water to generate a diluted dispersion having a concentration of seed particles of about 100 ppm (0.1 kg/tonne).

As discussed above, the injection water is either obtained from a single source or from a plurality of sources with the proviso that the ions in the commingled injection water do not combine to form insoluble mineral salts. It is envisaged that the dispersion of seed particles in the injection water may be prepared by mixing at least a portion of the injection water with a water that is incompatible with the injection water. Thus, where the injection water is seawater (containing $SO_4^{2-}$ and soluble carbonate ions), the dispersion of seed particles may be prepared by mixing at least a portion of the seawater (first aqueous solution) with a produced water that contains $Ba^{2+}$ and $Ca^{2+}$ ions (second aqueous solution).

In a further embodiment of the present invention there is provided a dispersion of seed particles of an insoluble mineral salt in an aqueous medium that has mineral salt precursor ions dissolved therein wherein the equivalent spherical diameter of the seed particles is 100% less 100 nm, preferably, 100% less than 50 μm, more preferably, 100% less than 25 nm, and the concentration of the precursor ions in the aqueous medium is at least 100 ppm.

BRIEF DESCRIPTION OF THE DRAWINGS

The invention will now be described with reference to the drawings, in which.

The invention will now be further illustrated with reference to the following examples and FIGS. 1, 2 and 3.

EXAMPLES

Example 1

Seed particles of barium sulfate ($BaSO_4$) were produced by mixing equal volumes of:
  (a) a solution of barium chloride ($BaCl_2$; 1.2 g/dm$^3$) in a mixture of water and ethanol (1:1 ratio by volume); and
  (b) a solution of potassium sulfate ($K_2SO_4$; 0.6 g/dm$^3$) in a mixture of water and ethanol (1:1 ratio by volume).

The total volume of the resulting mixture was in the range 1 to 10 ml.

Figure 1:
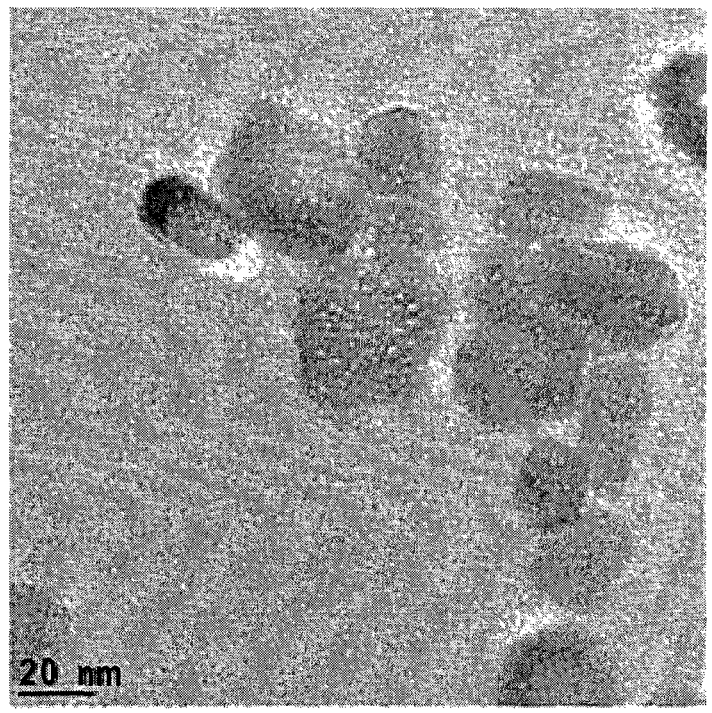
FIG. 1 is a transmission electron microscope (TEM) image of the barium sulfate seed particles formed in Example 1.

FIG. 1 is a transmission electron microscope (TEM) image of the barium sulfate seed particles formed in Example 1. It can be seen that the individual particles have a maximum dimension of length, breadth or thickness of 100% less than 40 nm. Accordingly, the equivalent spherical diameter will be 100% less than 100 nm.

Example 2

Seed particles of barium sulfate ($BaSO_4$) were produced by mixing equal volumes of:

(a) a solution of barium chloride ($BaCl_2$; 1.2 g/dm$^3$) and sodium chloride (NaCl; 1.0 g/dm$^3$) in a mixture of water and ethanol (1:1 ratio by volume); and (b) a solution of potassium sulfate ($K_2SO_4$; 0.6 g/dm$^3$) in a mixture of water and ethanol (1:1 ratio by volume).

The total volume of the resulting mixture was in the range 1 to 10 ml.

Figure 2:
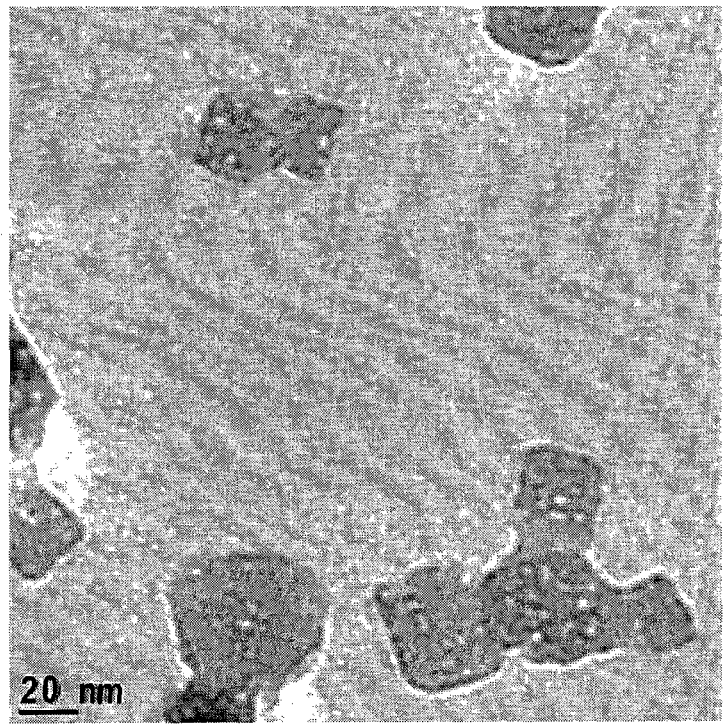
FIG. 2 is a transmission electron microscope (TEM) image of the barium sulfate seed particles formed in Example 2.

FIG. 2 is a transmission electron microscope (TEM) image of the barium sulfate seed particles formed in Example 2. It can be seen that the individual particles have a maximum dimension of length, breadth or thickness of 100% less than 80 nm. Accordingly, the equivalent spherical diameter will be 100% less than 100 nm.

Example 3

In a further experiment, a 2.5 mM solution of $BaCl_2$ and a 2.9 mM solution of $K_2SO_4$ in a 50:50 by volume mixture of water and ethanol were prepared. These solutions were carefully mixed in small volumes such that about 0.029-0.203 mmoles of $K_2SO_4$ was added to about 0.25 mmoles of $BaCl_2$.

Figure 3:
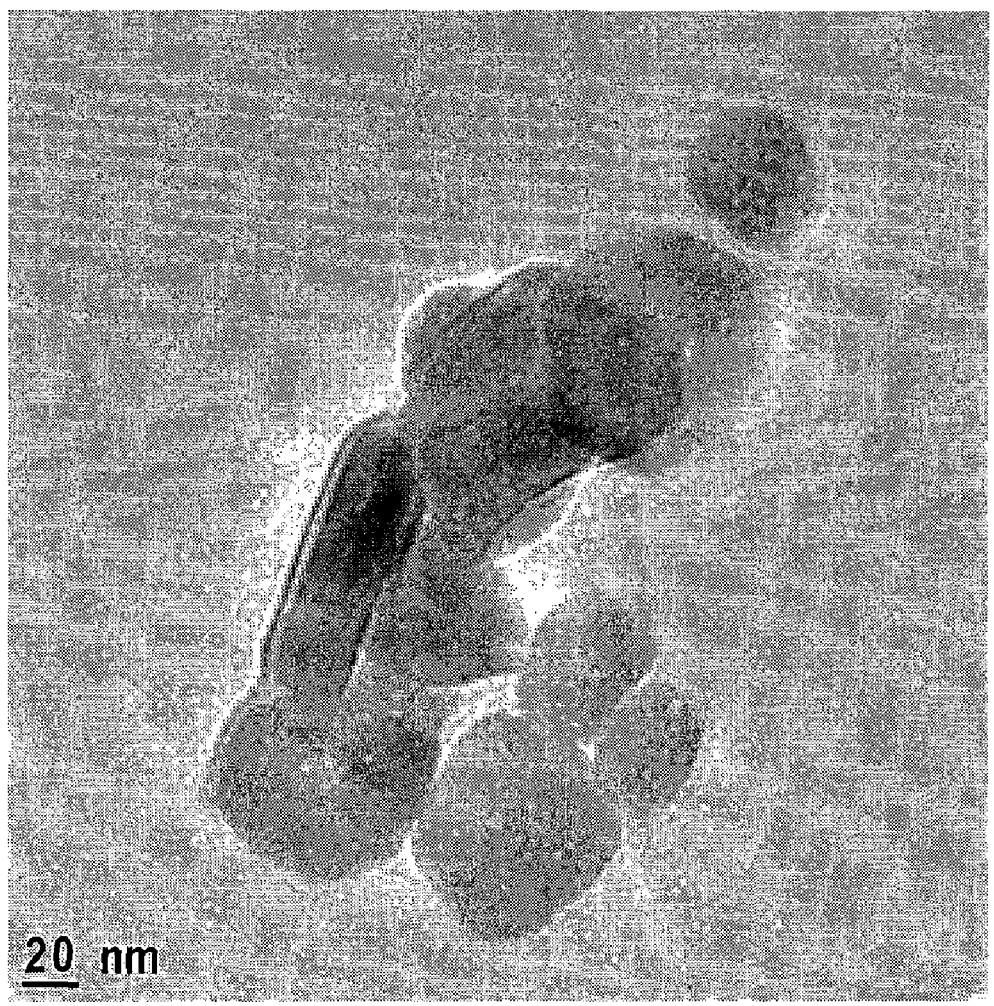
FIG. 3 is a transmission electron microscope (TEM) image of the barium sulfate seed particles formed in Example 3.

FIG. 3 is a transmission electron microscope (TEM) image of the barium sulfate seed particles formed in Example 3. It can be seen that the individual particles have a maximum dimension of length, breadth or thickness of 100% less than 100 nm. Accordingly, the equivalent spherical diameter will be 100% less than 100 nm.

The invention claimed is:

1. A method of inhibiting deposition of an insoluble mineral salt onto one or more locations selected from the group consisting of the walls of a porous formation, a surface in a production well and a surface downstream of the production well, the method comprising:
   (a) injecting a dispersion of seed particles of an insoluble mineral salt in an aqueous medium into the formation through an injection well wherein the seed particles have an equivalent spherical diameter of 100% less than 100 nm, and the aqueous medium has dissolved therein precipitate precursor ions that form a precipitate of the insoluble mineral salt when contacted with resident ions in the formation;
   (b) allowing the dispersion to percolate through the subterranean formation towards the production well and producing the dispersion from the production well; and
   (c) controllably precipitating the insoluble mineral salt onto the seed particles in one or more locations selected from the group consisting of the formation, the production well and downstream of the production well so as to reduce the deposition of the insoluble mineral salt onto one or more of the walls of the porous formation, the surface in the production well and the surface downstream of the production well.

2. A method according to claim 1 wherein the formation is a hydrocarbon-bearing formation and the hydrocarbons are displaced with the dispersion towards the production well and are co-produced from the production well with the dispersion.

3. A method according to claim 1 wherein the precursor ions are selected from the group consisting of $SO_4^{2-}$, $CO_3^{2-}$, $HCO_3^-$, and $HS^-$.

4. A method according to claim 1 wherein the resident ions in the formation are selected from the group consisting of $Ba^{2+}$, $Sr^{2+}$, $Mg^{2+}$, $Ca^{2+}$, $Fe^{2+}$, $Fe^{3+}$, $Al^{3+}$, $Pb^{2+}$, and $Zn^{2+}$.

5. A method according to claim 1 wherein the aqueous medium is an injection water selected from the group consisting of seawater, aquifer water, produced water, and river water.

6. A method according to claim 1 wherein the seed particles that are dispersed in the aqueous medium are of equivalent spherical diameter 100% less than 50 nm.

7. A method according to claim 1 wherein the concentration of seed particles in the aqueous medium is less than 200 ppmw (0.2 kg/tonne).

8. A method according to claim 1 wherein the seed particles grow within the formation to a size no greater than an equivalent spherical diameter of 100% less than 150 nm.

9. A method according to claim 1 wherein the dispersion propagates through the formation at a rate of 15 to 100 feet per day (4.57 to 30.48 meters per day).

10. A method according to claim 1 wherein the injection well is 0.25 to 1 mile (0.40 to 1.61 km) from the production well.

11. A method according to claim 1 wherein the concentration of resident ions in the aqueous medium of the dispersion is below the limit of detection and the concentration of precipitate precursor ions in the aqueous medium of the dispersion is above 100 ppm (100 mg/l) prior to contacting the resident ions in the formation.

12. A method according to claim 1 wherein the dispersion of seed particles in the aqueous medium is prepared by mixing a first aqueous solution of the precipitate precursor ions with second aqueous solution of resident ions in a reactor vessel wherein (i) the concentration of precipitate precursor ions in the first aqueous solution is in the range 50 to 2000 ppm (50 to 2000 mg/l); (ii) the concentration of resident ions in the second aqueous solution is in the range 50 to 2000 ppm (50 to 2000 mg/l); and (iii) the mixing ratio of the first aqueous solution to the second aqueous solution is in the range 1:3 to 3:1 by volume.

13. A method according to claim 12 wherein a $C_1$-$C_4$ alkanol is added to one or both of the first and second aqueous solutions in an amount of from 1:3 to 3:1 by volume.

14. A method according to claim 12 wherein the first aqueous solution is mixed with the second aqueous solution at a shear rate of at least 1 ms$^{-1}$.

15. A method according to claim 12 wherein the residence time of the seed particles in the reactor vessel is less than 10 minutes.

16. A method according to claim 12 wherein the first aqueous solution is an injection water that contains precipitate precursor ions.

17. A method according to claim 16 wherein the dispersion of seed particles in the injection water is prepared by mixing a minor portion of the injection water with the second aqueous solution to generate a sol having dispersed therein seed particles of the insoluble mineral salt and the sol is then diluted back into the major portion of the injection water.

18. A method according to claim 1 wherein the injection water is seawater.

19. A method according to claim 17 wherein the concentration of seed particles in the sol is in the range 500 to 1500 ppm (0.5 to 1.5 kg/tonne) and the concentration of seed particles in the diluted dispersion of seed particles is in the range 50 to 150 ppm (0.05 to 0.15 kg/tonne).

20. A method according to claim 1 wherein the concentration of seed particles in the aqueous medium is less than 100 ppmw (0.1 kg/tonne).

21. A method according to claim 12 wherein the first aqueous solution is mixed with the second aqueous solution at a shear rate of at least 5 ms$^{-1}$.

22. A method according to claim 12 wherein the residence time of the seed particles in the reactor vessel is less than 5 minutes.

23. A dispersion of seed particles of an insoluble mineral salt in an aqueous medium that has mineral salt precursor ions dissolved therein wherein the equivalent spherical diameter of the seed particles is 100% less than 100 nm and the concentration of the precursor ions in the aqueous medium is at least 100 ppm (100 mg/l).

24. A dispersion as claimed in claim 23 wherein the concentration of seed particles in the aqueous medium is less than 200 ppmw (0.2 kg/tonne).

25. A dispersion as claimed in claim 23 wherein the aqueous medium is seawater and the seed particles are selected from the group consisting of barium sulfate and barium carbonate.

26. A dispersion as claimed in claim 23 wherein the equivalent spherical diameter of the seed particles is 100% less than 50 nm.

* * * * *